(12) United States Patent
Millett

(10) Patent No.: US 7,656,579 B1
(45) Date of Patent: Feb. 2, 2010

(54) AUTO ZOOM AIMING DEVICE

(75) Inventor: James Millett, Huntington Beach, CA (US)

(73) Assignee: Bushnell Inc., Overland Park, KS (US)

( * ) Notice: Subject to any disclaimer, the term of this patent is extended or adjusted under 35 U.S.C. 154(b) by 150 days.

(21) Appl. No.: 11/804,750

(22) Filed: May 21, 2007

(51) Int. Cl.
*G02B 23/00* (2006.01)
*F41G 1/00* (2006.01)
*F41G 1/38* (2006.01)

(52) U.S. Cl. .................. 359/400; 359/824; 42/111; 42/122; 89/28.05; 89/41.05

(58) Field of Classification Search ................. 359/400, 359/823, 824, 425, 399, 422; 89/28.05, 41.02, 89/41.03, 41.05, 41.17, 41.18, 200, 205; 42/70.11, 100, 106, 122; 382/100, 104, 108, 382/154; 396/52, 53, 55, 325, 428; 701/1–3, 701/208, 220; 700/171, 176, 245
See application file for complete search history.

(56) References Cited

U.S. PATENT DOCUMENTS

| 3,659,494 | A | * | 5/1972 | Philbrick et al. | ........... 89/28.05 |
| 4,063,815 | A | * | 12/1977 | Wilken et al. | ................. 356/29 |
| 4,302,191 | A | * | 11/1981 | Weibull | ........................ 434/20 |
| 6,704,619 | B1 | * | 3/2004 | Coleman et al. | ............ 700/245 |
| 7,231,862 | B1 | * | 6/2007 | Quinn | ........................ 89/41.05 |
| 7,455,007 | B2 | * | 11/2008 | Quinn | ........................ 89/41.18 |
| 2006/0201047 | A1 | * | 9/2006 | Lowrey, III | .................. 42/122 |

\* cited by examiner

*Primary Examiner*—Loha Ben
(74) *Attorney, Agent, or Firm*—Hovey Williams LLP

(57) ABSTRACT

An improved electronic aiming device for use with a weapon or other manually aimed device. Means are provided to vary the field of view, i.e., the magnification, of the aiming device in relation to the movement of the device upon which the aiming device is securely mounted and the target.

15 Claims, 1 Drawing Sheet

AUTO ZOOM AIMING DEVICE

BACKGROUND OF THE INVENTION

1. Field of the Invention

This invention is directed to aiming devices, in general, and to aiming devices with electronically enhanced target acquisition capabilities, in particular.

2. Prior Art. When acquiring a target with a firearm, it is most convenient to have a wide field of view through the associated aiming device in order to initially find the target. Typically, such a wide field of view provides a low level of magnification. Once the target is located, it is then desirable to have less field of view with more magnification to improve accuracy at the target.

Typically, the user must (a) set the device to a compromise magnification setting; (b) set the device at low magnification to acquire the target and then adjust to high magnification to fire the weapon; or (c) spend considerable time attempting to acquire the target at high magnification. The first option is rife with guesswork as to compromise settings. Often there is insufficient time to perform the second option. The third option is unwieldy in acquiring the target with a highly sensitive process. This invention uses electronically controlled electronic zoom to solve this dilemma by providing variable magnification.

There are many variable magnification aiming devices on the market today. For example electronic zoom is commonly used in video and still cameras today as well as certain aiming devices. However, in these cases, the amount of electronic zoom is manually controlled by the user. The instant invention operates to relate the movement of the aiming device (or the associated weapon or device which is to be manually aimed) to the electronic zoom of the field of view at the viewing screen.

SUMMARY OF THE INSTANT INVENTION

The instant invention provides an electronic image of a target with a reticule image, i.e., cross hairs superimposed on an integral viewing screen via a video camera module and an image processor. When the aiming device on a weapon or device to be manually aimed is in motion, i.e. the user is looking for a target to aim at, the image processor presents an image with a large field of view to the viewing screen. When the aiming device or device to be manually aimed becomes stationary (within set limits), i.e. the user has zeroed in on a target, the image processor rapidly presents an image to the viewing screen with a progressively smaller field of view. Conversely, when the aiming device is moved beyond the set limits, the field of view of the image is progressively increased. The change in field of view is referred to as electronic zoom.

DESCRIPTION OF A PREFERRED EMBODIMENT

Figure 1:
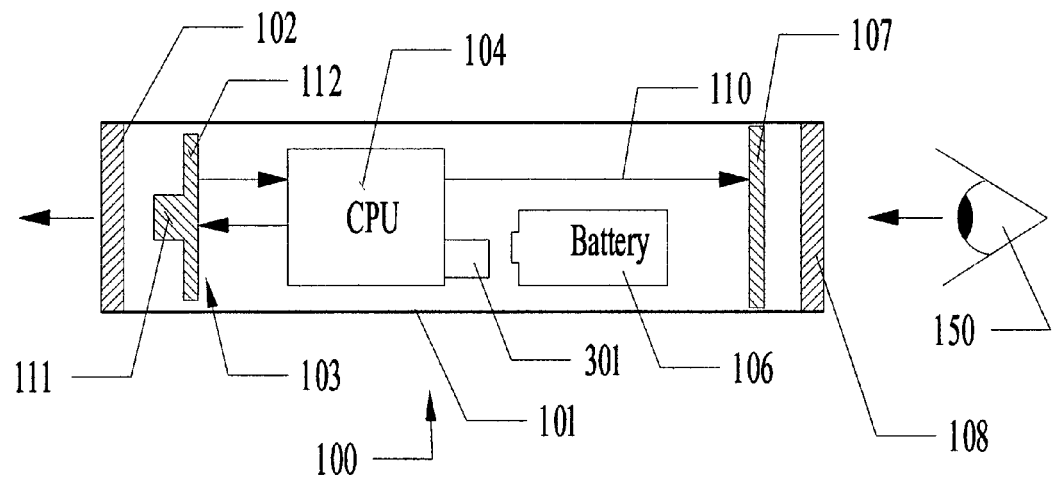
FIG. 1 is a schematic cutaway representation of one embodiment of the instant invention.

Referring now to FIG. 1, there is shown a representative cutaway schematic view of one embodiment of the aiming system 100 of the instant invention. Of course other configurations can be utilized depending upon the actual use of the aiming system, e.g. with a rifle, with a handgun or with other types of devices that need to be manually aimed.

The system (or device) shown in FIG. 1 includes an elongated tubular housing 101, typically, but limitatively fabricated of anodized aluminum or the like which provides the enclosure for the electronic components. A window 102 is affixed to one end to the tubular housing 101. The window 102 is transparent glass or plastic to allow the camera 103 to "see" out of the forward end of the housing 101.

A window 108 is affixed to the opposite end of the tubular transparent glass or plastic to allow the user 150 to see into the housing 101 to view the viewing screen 107.

The image processor 104 and its associated electronics are mounted to the housing 101. A power source such as battery 106 provides power to the system.

In a preferred, but not limitative embodiment, the camera 103 includes a lens 111 mounted on or adjacent to an image sensor 112. The sensor 112 comprises an array of pixels in the order of 648×488. However, the camera 103 is directed by the processor 104 to send data from only a portion of the total array as indicated by the arrow 110. This smaller portion of the total array is called the region of interest and is an array of 475×315 pixels, for example.

The camera 103 can be directed to position this region of interest anywhere within the total array. This arrangement provides a means to allow for windage and elevation adjustment of the image sent by the camera 103 to the processor 104 so as to align the line of sight of the aiming device 100 with the weapon (not shown) upon which it is mounted.

The viewing screen 107 is, typically, an LED module (of the type manufactured by FEMA Electronics Corporation) or the like composed of an array of 95×63 pixels.

On the other hand, in this embodiment, the aiming device 100 has, for example, five possible fields of view. That is, the processor 104 receives the full pixels region of interest array from the camera 103, in this embodiment 475×315 and selects the appropriate pixels to create any one of the following five possible 95×63 pixel arrays to transmit the viewing screen 107 as indicated by arrow 110. In this exemplar, five fields of view and a 475×315 region of interest are chosen for purposes of explanation. It should be noted that any number of fields of view can be used. The number of possible fields of view relates to the smoothness of transition during the electronic zoom process.

| | | |
|---|---|---|
| Field of view # 1. (Widest) | 475 × 315 = 475/5 = 95 | 315/5 = 63 |
| Field of view # 2. | 380 × 252 = 380/4 = 95 | 252/4 = 63 |
| Field of view # 3. | 285 × 189 = 285/3 = 95 | 189/3 = 63 |
| Field of view # 4. | 190 × 126 = 190/2 = 95 | 126/2 = 63 |
| Field of view # 5. (Narrowest) | 95 × 63 = 95 | 63 |

In this exemplar, in widest field of view array only 1 out of 5 pixels over the entire region of interest array is selected for use. In the narrowest field of view only the center 95×63 group of pixels is selected for direct transmission to the viewing screen 107. It is to be understood that alternative arrangements can be made relative to the fields of view.

In operation, the camera 103 receives light input through lens 111 and transmits a numeric value ranging from 0 to 255 for each pixel in the region of interest array. This value determines the lightness of each pixel wherein 0 is the darkest value and 255 is the lightest value.

The image processor 104, preferably, a low power consumption complex programmable logic array or microprocessor, samples the value of certain specified pixels in the array and stores that information. At predetermined time intervals, the image processor 104 re-samples the same pixels and compares the current value to the stored value. If the new values have changed (up or down) outside of preset limits, the image processor 104 interprets that the weapon or device to be manually aimed point of aim has moved. The image processor 104 then proceeds to send a wider field of view array (see above) to the viewing screen 107 which is seen by the observer 150.

Conversely, if the value of the specified pixels does not change, the image processor 104 interprets that the weapon's point of aim has not changed, that a target has been acquired, and then proceeds to send a narrower field of view array to the viewing screen 107. This operation continues with smaller and smaller arrays (representing higher and higher magnification) being selected. This operation has the effect of an electronic zoom action which provides a more accurate sighting of the actual target.

Typically, the zoom operation takes place in a time range of two or three seconds. Thus, a user can pan a large field of view for gross target acquisition and, by reducing or stopping the panning motion, permit the sighting device to acquire a high magnification target.

It should be understood that the operation described is described as a "step-wise" variation. However, the gradations are such (and performed at such high speed) that the zoom effects can appear to the observers 150 as a continuous process.

In addition to presenting an image of a predetermined region of interest to the viewing screen 107, the image processor 104 also superimposes a reference image in the center of the region of interest image. The superimposed reference image can be cross-hairs, a circle, a dot, or whatever shape that is deemed desirable for point of aim reference. The pixels that create the reference image must also have a numeric value. This numeric value is determined by the image processor 104 as follows. The numeric value of the pixels surrounding the reference image is averaged. The image processor 104 then selects a pixel value for the reference image that presents the greatest contrast between the reference image and the region of interest image, i.e., when the surrounding pixels in the region of interest image are dark, the reference image pixels are directed to be light. Conversely, when the surrounding pixels in the region of interest image are light, the reference image pixels are directed to be dark.

The composite image is then presented to the viewing screen 107.

Figure 2:
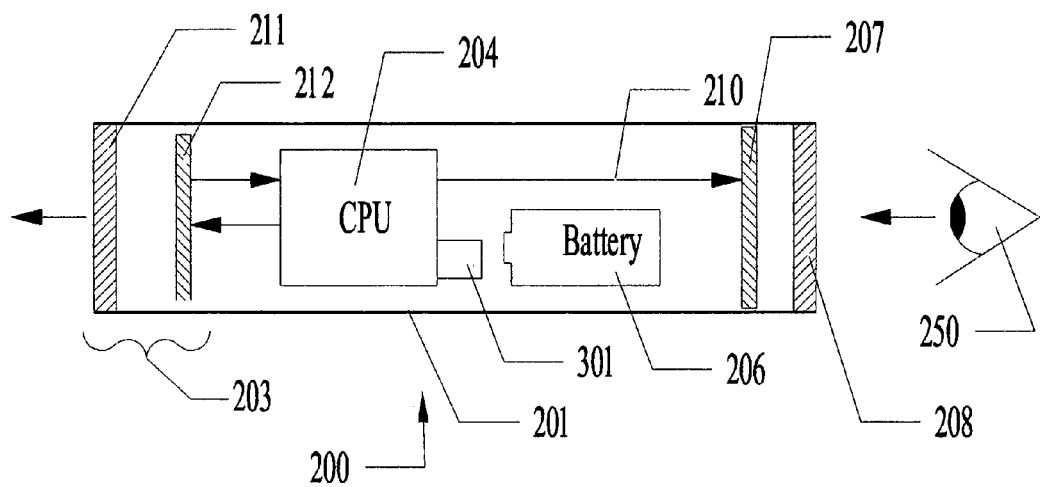
FIG. 2 is a schematic cutaway representation of another embodiment of the instant invention.

Referring now to FIG. 2, there is shown a representative cutaway schematic view of another embodiment of the aiming system 200 of the instant invention. Of course other configurations can be utilized depending upon the actual use of the aiming system, e.g. with a rifle, with a handgun or with other types of devices to be manually aimed.

The system (or device) shown in FIG. 2 includes an elongated tubular housing 201, which provides the enclosure for the electronic and optical components similar to housing 101 described supra.

In this embodiment, the window 102 (of FIG. 1) is replaced by a lens 211 which is similar in function to the lens 111 in FIG. 1 and permits the camera 203 to see out of the forward end of the housing 201.

A window 208 is also a transparent glass or plastic window to allow the user 250 to see into the housing 201 to view the viewing screen 207. The image processor 204 and its associated electronics includes a power source such as battery 206 which provides power to the system, are mounted to the housing 201 as discussed supra.

Again, the camera 203 (which includes lens 211 and image sensor 212) operates as discussed above. The sensor 212 comprises an array of pixels in the order of 648×488. However; the camera 203 is directed by the image processor 104 to send data from only a portion of the total array as indicated by the arrow 210. This smaller portion of the total array is called the region of interest and is an array of 475×315 pixels, for example.

The camera 203 can be directed to position this region of interest anywhere within the total array. This arrangement provides a means to allow for windage and elevation adjustment of the image sent by the camera 203 to the processor 204 so as to align the line of sight of the aiming device 200 with the weapon (not shown) upon which it is mounted.

As described above, the viewing screen 207 is, typically, an LED module or the like composed of an array of 95×63 pixels or similar. Meanwhile, the aiming device 200 has multiple possible fields of view. That is, the image processor 204 receives the full pixels region of interest array from the camera 203, which may be the same as discussed supra or some other array as desired. Any of the multiple pixel arrays is transmitted to the viewing screen 207 as indicated by arrow 210. (Of course, other configurations can be utilized.)

In the widest field of view array only 1 out of a selected number of pixels over the entire region of interest array is used. In the narrowest field of view only the center group of pixels is selected for direct transmission to the viewing screen 207.

In, operation, the camera 203 receives light input through lens 211 and transmits a numeric value ranging from 0 to 255 for each pixel in the region of interest array which value determines the lightness of each pixel as described above.

The image processor 204 samples the value of certain specified pixels in the array and stores that information. At predetermined time intervals, the image processor 204 re-samples the same pixels and compares the current value to the stored value. If the new values have changed (up or down) outside of preset limits the image processor 204 interprets that the aiming device's point of aim has moved whereupon the image processor 204 then proceeds to send a wider field of view array (see above) to the viewing screen 207.

Conversely, if the value of the specified pixels does not change, the image processor 204 interprets that the weapon's point of aim has not changed, that a target has been acquired, and proceeds to send a narrower field of view array to the viewing screen 207. This operation continues with smaller and smaller arrays (representing higher and higher magnification) being selected. This has the effect of an electronic zoom action which provided a more accurate sighting of the actual target. Typically, the zoom operation takes place in a time range of about two or three seconds. Thus, a user can pan a large field of view for gross target acquisition and, by reducing or stopping the relative motion, permit the sighting device to acquire a high magnification target.

Referring again to FIGS. 1 and 2, there is shown an electronic motion sensor such as a gyro chip 301, or the like. With the insertion of a gyro chip 301 (or accelerometer), instead of the image processor 104 (or 204) sensing the weapon motion by examining the specified pixel array, the gyro chip 301 is used to supply a signal to the image processor 104 (or 204) that the weapon is in motion (or not) and, thereby, cause the image processor 104 (or 204) to change the field-of-view array as described supra.

Thus, there is shown and described a unique design and concept of an auto zoom aiming device. While this description is directed to particular embodiments, it is understood that those skilled in the art may conceive modifications and/or variations to the specific embodiments shown and described herein. Any such modifications or variations which are within the purview of this description are intended to be included therein as well. It is understood that the description herein is intended to be illustrative only and is not intended to be limitative. Rather, the scope of the invention described herein is limited only by the claims appended hereto.

The invention claimed is:

1. An aiming device comprising:
   a camera with a lens for acquiring images of objects at which the aiming device is aimed;
   a viewing screen for displaying the images to a user of the aiming device; and
   an image processor coupled with the camera and the viewing screen and configured to display a relatively wide field of view on the viewing screen when the image processor determines the aiming device is moving and to display a relatively narrow field of view on the viewing screen when the image processor determines the aiming device is generally stationary.

2. The aiming device as set forth in claim 1, wherein the image processor displays three or more fields of view on the viewing screen in a step-wise fashion based on movement of the aiming device.

3. The aiming device as set forth in claim 2, wherein the more fields of view are at least five fields of view, and wherein the image processor displays: a first relatively widest field of view on the viewing screen when the image processor determines the aiming device is moving beyond preset limits; a second field of view that is narrower than the first field of view when the image processor determines the aiming device has not moved beyond the preset limits for a first time interval; a third field of view that is narrower than the second field of view when the image processor determines the aiming device has not moved beyond the preset limits for a second time interval greater than the first time interval; a fourth field of view that is narrower than the third field of view when the image processor determines the aiming device has not moved beyond the preset limits for a third time interval greater than the second time interval; and a fifth field of view that is narrower than the fourth field of view when the image processor determines the aiming device has not moved beyond the preset limits for a fourth time interval greater than the third time interval.

4. The aiming device as set forth in claim 1, wherein the image processor superimposes a reference image over the images displayed on the viewing screen.

5. The aiming device as set forth in claim 1, wherein the image processor determines that the aiming device is moving by monitoring a numeric value of selected pixels within the images presented by the camera.

6. The aiming device as set forth in claim 1, further including an electronic motion sensor for sensing whether the aiming device is moving and sending a corresponding signal to the image processor.

7. The aiming device as set forth in claim 6, wherein the electronic motion sensor is a gyro chip or accelerometer.

8. The aiming device as set forth in claim 1, further including a tubular housing for housing the camera, the viewing screen, and the image processor.

9. The aiming device as set forth in claim 8, wherein the tubular housing is adapted to be mounted on a firearm.

10. An aiming device comprising:
    a camera with a lens for acquiring images of objects at which the aiming device is aimed;
    a viewing screen for displaying the images to a user of the aiming device;
    an electronic motion sensor for sensing when the aiming device is moving; and
    an image processor coupled with the camera, the viewing screen, and the electronic motion sensor and configured to display a relatively wide field of view on the viewing screen when the aiming device is moving and to display a relatively narrow field of view on the viewing screen when the aiming device is generally stationary.

11. The aiming device as set forth in claim 10, wherein the image processor displays: a first relatively widest field of view on the viewing screen when the aiming device is moving beyond preset limits; a second field of view that is narrower than the first field of view when the aiming device has not moved beyond the preset limits for a first time interval; a third field of view that is narrower than the second field of view when the aiming device has not moved beyond the preset limits for a second time interval greater than the first time interval; a fourth field of view that is narrower than the third field of view when the aiming device has not moved beyond the preset limits for a third time interval greater than the second time interval; and a fifth field of view that is narrower than the fourth field of view when the aiming device has not moved beyond the preset limits for a fourth time interval greater than the third time interval.

12. The aiming device as set forth in claim 11, wherein the image processor superimposes a reference image over the images displayed on the viewing screen.

13. The aiming device as set forth in claim 10, wherein the electronic motion sensor is a gyro chip or accelerometer.

14. The aiming device as set forth in claim 10, further including a tubular housing for housing the camera, the viewing screen, and the image processor.

15. The aiming device as set forth in claim 14, wherein the tubular housing is adapted to be mounted on a firearm.

* * * * *